United States Patent
Cook et al.

(10) Patent No.: US 10,068,392 B2
(45) Date of Patent: Sep. 4, 2018

(54) SAFETY SCORE USING VIDEO DATA BUT WITHOUT VIDEO

(71) Applicant: Lytx, Inc., San Diego, CA (US)

(72) Inventors: Bryon Cook, San Diego, CA (US); Niki Kypri, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 100 days.

(21) Appl. No.: 15/420,470

(22) Filed: Jan. 31, 2017

(65) Prior Publication Data

US 2017/0236338 A1 Aug. 17, 2017

Related U.S. Application Data

(63) Continuation of application No. 14/012,136, filed on Aug. 28, 2013, now Pat. No. 9,594,725.

(51) Int. Cl.

| | |
|---|---|
| *G06F 19/00* | (2018.01) |
| *G07C 5/06* | (2006.01) |
| *G06F 17/30* | (2006.01) |
| *G06F 3/0482* | (2013.01) |
| *H04N 7/18* | (2006.01) |

(52) U.S. Cl.
CPC ............ *G07C 5/06* (2013.01); *G06F 3/0482* (2013.01); *G06F 17/3082* (2013.01); *H04N 7/181* (2013.01)

(58) Field of Classification Search
CPC ........ G07C 5/008; G07C 5/085; G06Q 40/08; G06Q 30/0283; G06F 7/00
USPC ......................................... 702/189, 182–185
See application file for complete search history.

(56) References Cited

U.S. PATENT DOCUMENTS

2007/0027583 A1* 2/2007 Tamir ................. G06Q 30/0283
701/1

* cited by examiner

*Primary Examiner* — Edward Raymond
(74) *Attorney, Agent, or Firm* — Van Pelt, Yi & James LLP

(57) ABSTRACT

A safety score using video data but without video comprises an input interface and a processor. The input interface is configured to receive sensor data. The processor is configured to provide the sensor data to a safety score determiner, and determine a safety score using the safety score determiner without using inward facing video data, wherein the safety score determiner has been trained using a data set that includes sensor data with inward facing video data. The system for determining a safety score additionally comprises a memory coupled to the processor and configured to provide the processor with instructions.

20 Claims, 10 Drawing Sheets

SAFETY SCORE USING VIDEO DATA BUT WITHOUT VIDEO

CROSS REFERENCE TO OTHER APPLICATIONS

This application is a continuation of co-pending U.S. patent application Ser. No. 14/012,136, entitled SAFETY SCORE USING VIDEO DATA BUT WITHOUT VIDEO filed Aug. 28, 2013 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. If an anomalous event is detected, then sensor data related to the event is stored for later review. Data from an inward facing video camera (e.g., containing an image of the driver) can be very useful for determining anomalous events. However, some vehicle event recorder users (e.g., drivers, fleet managers, etc.) do not allow the inward facing video camera data to be recorded or used for event detection.

BRIEF DESCRIPTION OF THE DRAWINGS

Various embodiments of the invention are disclosed in the following detailed description and the accompanying drawings.

DETAILED DESCRIPTION

Figure 1:
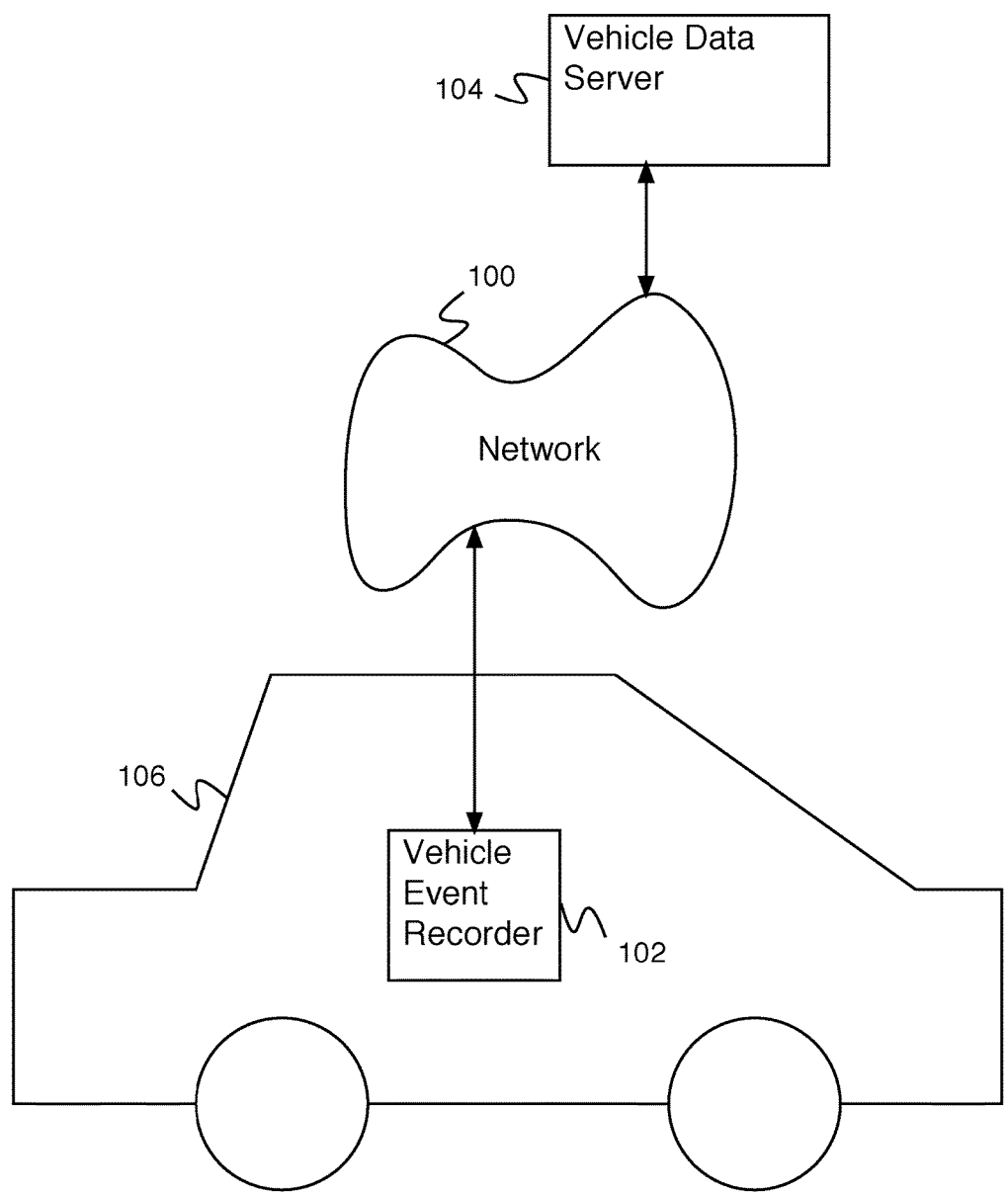
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A safety score using video data but without video is disclosed. A system for determining a safety score comprises an input interface configured to receive sensor data. The system for determining a safety score additionally comprises a processor configured to provide the sensor data to a safety score determiner, and determine a safety score using the safety score determiner without using inward facing video data, wherein the safety score determiner has been trained using a data set that includes sensor data with inward facing video data. The system for determining a safety score additionally comprises a memory coupled to the processor and configured to provide the processor with instructions.

A vehicle event recorder mounted on a vehicle records vehicle data and anomalous vehicle events. Anomalous vehicle event types include accidents, speed limit violations, rough road events, hard maneuvering events (e.g., hard cornering, hard braking), dangerous driving events (e.g., cell phone usage, eating while driving, working too long of a shift, sleepy driving, etc.), and any other appropriate kind of anomalous vehicle events. The vehicle event recorder analyzes data from sensors (e.g., video recorders, audio recorders, accelerometers, gyroscopes, vehicle state sensors, GPS, etc.) to determine when an anomalous event has occurred. In some embodiments, the vehicle event recorder applies one or more data processing techniques (e.g., filters, Fourier transform processing, neural networks, etc.) to sensor data to determine the probability of each of a set of hazardous events (e.g., hard maneuvering, collision, etc.). In the event that the probability of one or more of the hazardous events is above a corresponding threshold, the set of probabilities is saved as a maneuver point. Multiple maneuver points occurring within a time threshold of one another are grouped together to form a maneuver vector. In the event the sensors associated with the vehicle event recorder include video recorders, any available video data from the video recorders corresponding to the time of the maneuver is associated with the maneuver vector. The maneuver vector including video data, if available, is transmitted to a vehicle data server and analyzed. In some embodiments, the vehicle event recorder collects maneuver vectors over the course of a day and transmits them to the vehicle data server at the end of the day.

The vehicle event recorder analyzes the maneuver vector and any available video data to determine a safety score. In the event that video data is available, the safety score is determined by a manual safety score determiner comprising a human video reviewing station. A person views the available video data and indicates which of a set of dangerous behaviors are determined to be present. The safety score is computed from the behavior or behaviors indicated. The safety score is provided to a safety score database, where it is associated with the driver, and used in later calculations of the driver's overall safety score. In addition, the safety score is associated with the maneuver vector and provided to an automatic safety score determiner, which stores the maneuver vector and associated safety score. If the maneuver vector is already stored in the automatic safety score determiner with an associated safety score, an average safety score is computed, comprising the average of all safety scores received associated with the received maneuver vector. As a range of maneuver vectors with associated video data are received and processed manually, the automatic safety score determiner builds a library of maneuver vectors and typical associated safety score values. When a maneuver vector with no associated video data is received by the vehicle event recorder, it is provided to the automatic safety score determiner. The automatic safety score determiner looks up the maneuver vector in the library of maneuver vectors and returns the associated safety score value. In some embodiments, if the maneuver vector is not found in the library of maneuver vectors, the automatic safety score determiner determines the maneuver vector in the library that is most similar to the received maneuver vector (e.g., a library with source data from the same driver, from other drivers, etc.) and returns the safety score value associated with that maneuver vector.

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, GPS, outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises a system for detecting risky behavior. In various embodiments, vehicle event recorder 102 is mounted to vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global system for mobile communication (GSM) network, a local area network, a wide area network, the Internet, or any other appropriate network. In some embodiments, network 100 comprises multiple networks, changing over time and location. Vehicle event recorder 102 communicates with vehicle data server 104 via network 100. Vehicle event recorder 102 is mounted on vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In some embodiments, vehicle data server 104 is located at a remote location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly.

Figure 2:
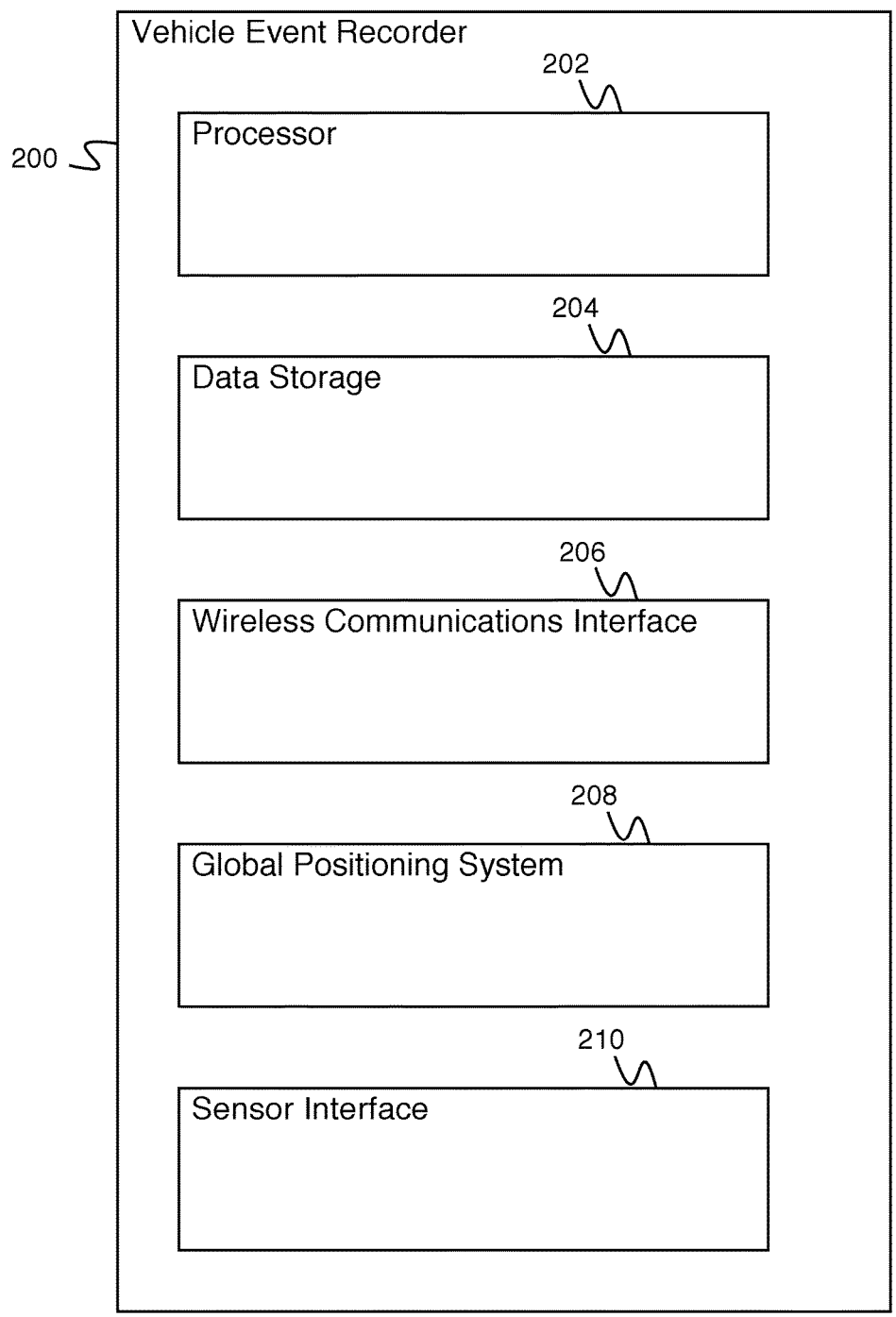
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises processor 202. Processor 202 comprises a processor for controlling the operations of vehicle event recorder 200, for reading and writing information on data storage 204, for communicating via wireless communications interface 206, for determining a position using global positioning system 208, and for reading data via sensor interface 210. Data storage 204 comprises a data storage (e.g., a random access memory (RAM), a read only memory (ROM), a nonvolatile memory, a flash memory, a hard disk, or any other appropriate data storage). In various embodiments, data storage 204 comprises a data storage for storing instructions for processor 202, vehicle event recorder data, vehicle event data, sensor data, video data, map data, or any other appropriate data. In various embodiments, wireless communications interface 206 comprises one or more of a GSM interface, a CDMA interface, a WiFi interface, or any other appropriate interface. Global positioning system 208 comprises a global positioning system (e.g., GPS) for determining a system location. Sensor interface 210 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine RPM sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 210 comprises an on-board diagnostics (OBD) bus. In some embodiments, vehicle event recorder 200 communicates with vehicle state sensors via OBD bus.

Figure 3:
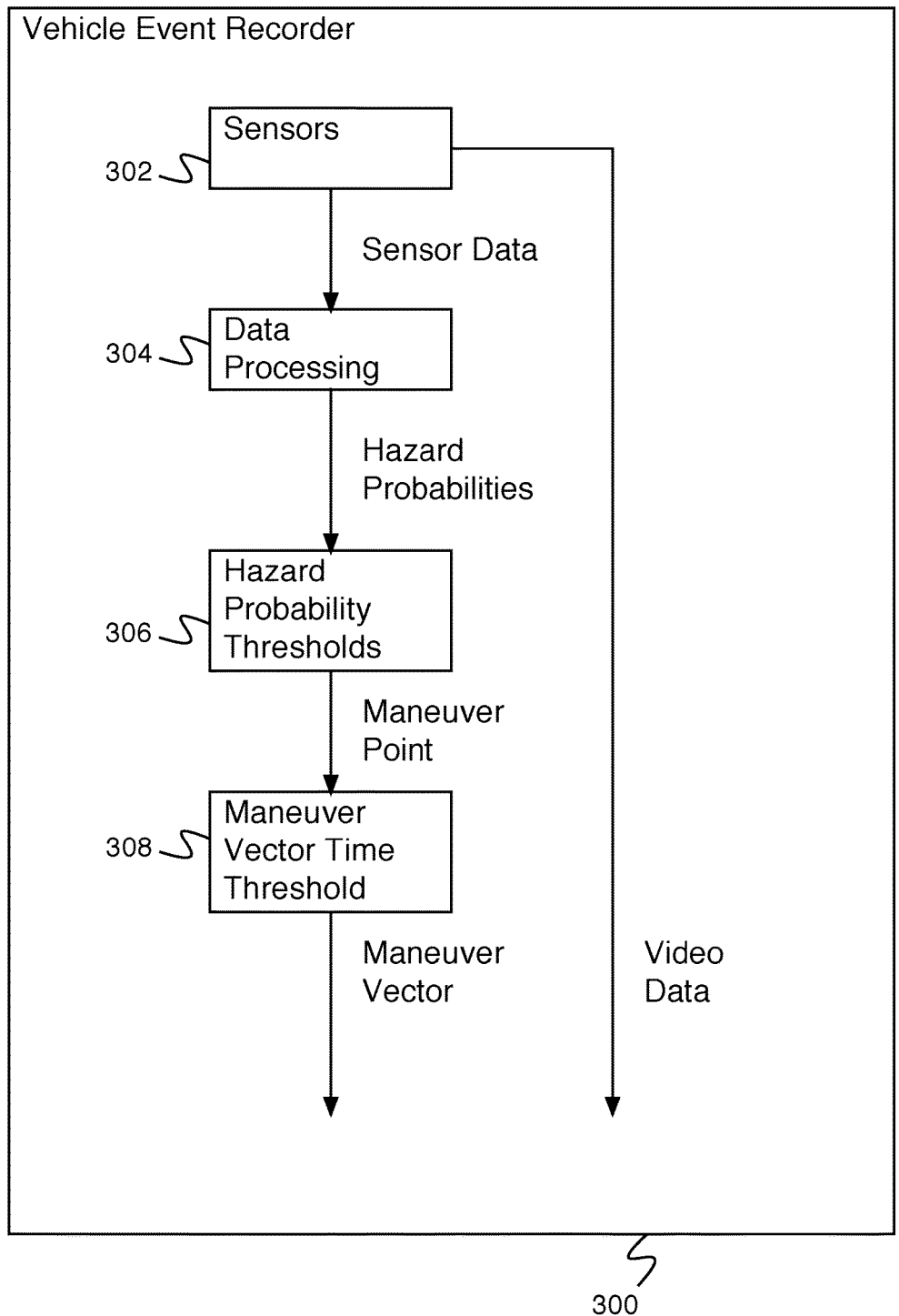
FIG. 3 is a block diagram illustrating an embodiment of a vehicle event recorder.

FIG. 3 is a block diagram illustrating an embodiment of a vehicle event recorder. In some embodiments, vehicle event recorder 300 of FIG. 3 comprises vehicle event recorder 200 of FIG. 2. In the example shown, vehicle event recorder 300 comprises sensors 302. In some embodiments, sensors 302 comprises a sensor interface and vehicle event recorder 300 is in communication with sensors via the sensor interface. Sensors 302 deliver sensor data to data processing 304. In various embodiments, sensor data comprises video camera data, microphone data, accelerometer data, gyroscope data, outdoor temperature sensor data, moisture sensor data, laser line tracker sensor data, vehicle state sensor data, or any other appropriate sensor data. In some embodiments, sensor data comprises calibrated accelerometer data from one or more accelerometers. Data processing 304 processes sensor data to determine a set of hazard probabilities. Hazard probabilities comprise the probabilities that one or more of a set of hazards are occurring. In various embodiments, data processing 304 comprises one or more of the following: digital filtering, digital Fourier transform processing, a neural network, or any other appropriate data processing technique. In various embodiments, hazard probabilities comprise a probability of hazardous acceleration, a probability of hazardous braking, a probability of a collision, a probability of hazardous left cornering, a probability of hazardous right cornering, a probability of a hazardous rough road, a probability of another hazardous condition, or any other appropriate hazard probability. Data processing 304 provides hazard probabilities to hazard probability thresholds 306. Hazard probability thresholds 306 determines if any of the hazard probabilities received from data processing 304 are above their corresponding hazard probability threshold. If none of the hazard probabilities are above the corresponding hazard probability threshold, the set of hazard probabilities is discarded. If any of the hazard probabilities is above the corresponding hazard probability threshold, the set of hazard probabilities is labeled a maneuver point. Hazard probability thresholds 306 provides maneuver points to maneuver vector time threshold 308. Maneuver vector time threshold 308 determines if a received maneuver point is within a time threshold of a maneuver vector. In some embodiments, if two maneuver points are received within a time threshold of one another, the two maneuver points are determined to be a part of the same maneuver vector. As maneuver points are received within the time threshold of an existing maneuver vector, the maneuver points are added to the maneuver vector. In some embodiments, the time threshold comprises a time since the first received maneuver point in the maneuver vector. In some embodiments, the time threshold comprises a time since the last received maneuver point in the maneuver vector. When a maneuver vector is completed, it is delivered to a vehicle data server. In some embodiments, the maneuver vector is stored and delivered to the vehicle data server at a later point in time (e.g., when the vehicle checks in at a depot, at the end of the day, at the end of the driver shift, etc.). In some embodiments, if sensors 302 combine video sensors (e.g., an inward-facing video camera, a forward-facing video camera), video data corresponding to the time period of a maneuver vector is delivered to the vehicle data server associated with the maneuver vector.

Figure 4:
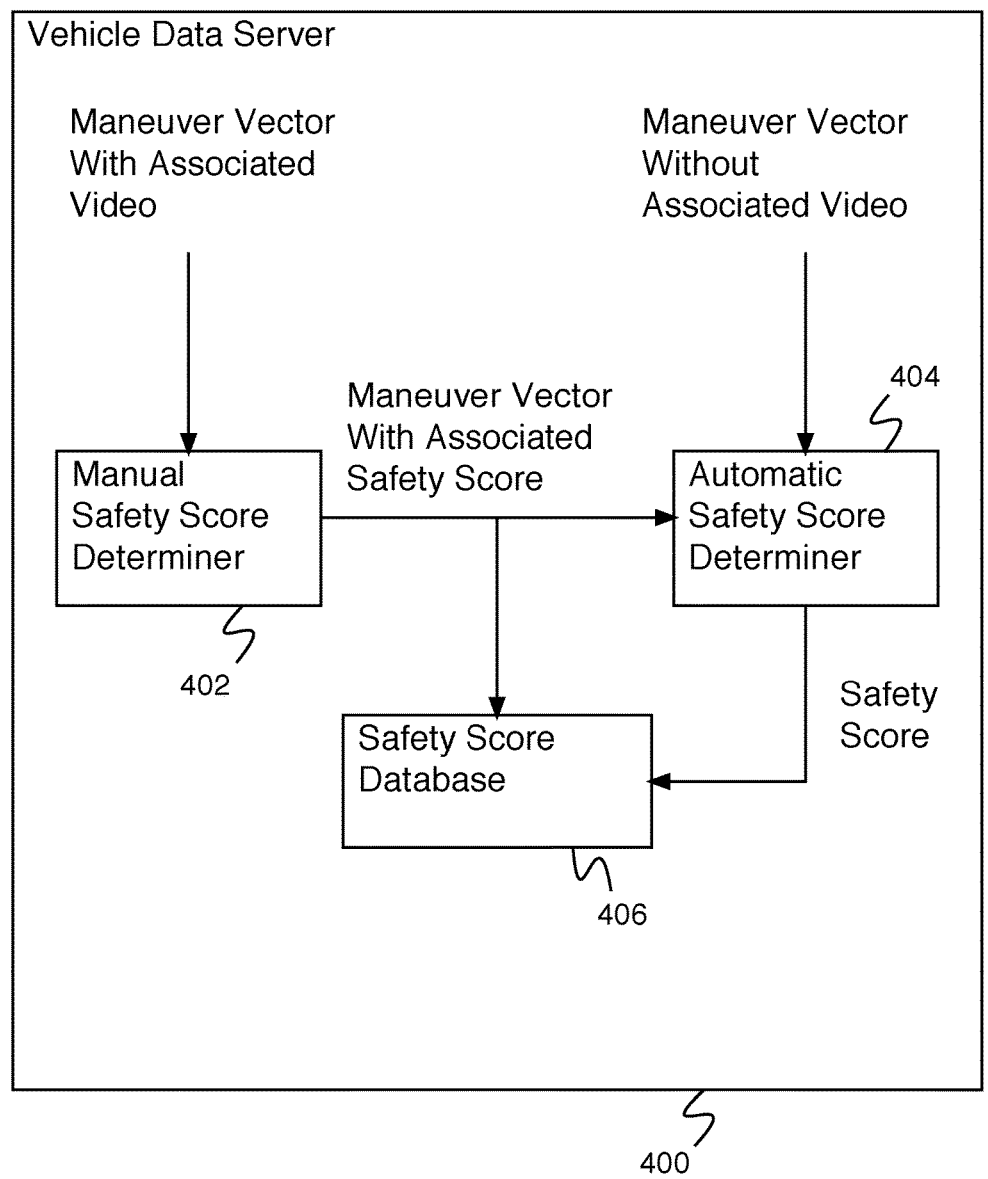
FIG. 4 is a block diagram illustrating an embodiment of a vehicle data server.

FIG. 4 is a block diagram illustrating an embodiment of a vehicle data server. In some embodiments, vehicle data server 400 comprises vehicle data server 104 of FIG. 1. In the example shown, vehicle data server 400 receives maneuver vectors from one or more vehicle event recorders (e.g., associated with one or more different vehicles). Some maneuver vectors received include associated video data, and some maneuver vectors received have no associated video. In some embodiments, some vehicle event recorders do not include or communicate with video recorders, and do not provide video data associated with maneuver vectors. In the example shown, when vehicle data server 400 receives a maneuver vector with associated video, it is provided to manual safety score determiner 402. Manual safety score determiner 402 manually determines a safety score associated with the maneuver vector with associated video. In some embodiments, manual safety score determiner 402 determines a safety score by displaying video to a maneuver reviewer (e.g., a human) and receiving from the maneuver reviewer a set of associated hazardous behaviors. In some embodiments, the safety score comprises a sum of safety scores associated with each of the set of hazardous behaviors. Manual safety score determiner 402 provides the maneuver vector and the associated safety score to automatic safety score determiner 404 and driver safety score database 406. Automatic safety score determiner 404 stores maneuver vectors and associated safety scores received from manual safety score determiner in a library of maneuver vectors with associated safety scores. In some embodiments, if automatic safety score determiner 404 receives a maneuver vector for which it has already received one or more safety scores, an average safety score is computed, comprising the average of all safety scores received associated with the received maneuver vector. As a range of maneuver vectors with associated video data are received and processed by manual safety score determiner 402, automatic safety score determiner 404 builds a library of maneuver vectors and typical associated safety score values. In some embodiments, building a library of maneuver vectors and typical associated safety score values comprises training automatic safety score determiner 404. In some embodiments, in order to rapidly build a library of maneuver vectors and typical associated safety score values, a third party data set of maneuver vectors with associated video data is used to train automatic safety score determiner 404. In some embodiments, a third party data set of maneuver vectors with associated video data comprises a set of maneuver vectors with associated video data purchased from an external source.

When vehicle data server 400 receives a maneuver vector without associated video, the maneuver vector is provided to automatic safety score determiner 404. Automatic safety score determiner utilizes its library of maneuver vectors and typical associated safety score values to determine a safety score value associated with the received maneuver vector. In various embodiments, automatic safety score determiner 404 determines the safety score by using a table, by interpolating between entries in a table, by using a neural network, by using machine learning techniques, by using a support vector machine, by leveraging ensemble modeling, or by using any other appropriate technique. Automatic safety score determiner 404 provides the safety score to safety score database 406. Safety score database 406 comprises a database of safety scores of maneuver vectors. In some embodiments, safety score database 406 determines an overall safety score for a driver (e.g., by summing the safety scores associated with maneuver vectors over each day and determining the average safety score accumulated over a given week). In some embodiments, safety score database 406 determines an overall safety score for a fleet of drivers (e.g., by averaging the overall safety score for each driver in the fleet). In some embodiments, safety score database 406 determines a list of unsafe drivers (e.g., by taking the set of drivers with the worst safety scores, by taking the set of drivers with safety scores worse than a threshold, etc.).

In some embodiments, when a maneuver vector with associated video is received by vehicle data server 400 of FIG. 4, it is provided to both manual safety score determiner 402 and automatic safety score determiner 404. When safety score database 406 receives the safety scores from each of manual safety score determiner 402 and automatic safety score determiner 404, it combines the two safety scores by averaging, weighted averaging, using a nonlinear combination, picking one of the two scores to use, or combining the scores in any other appropriate way.

Figure 5:
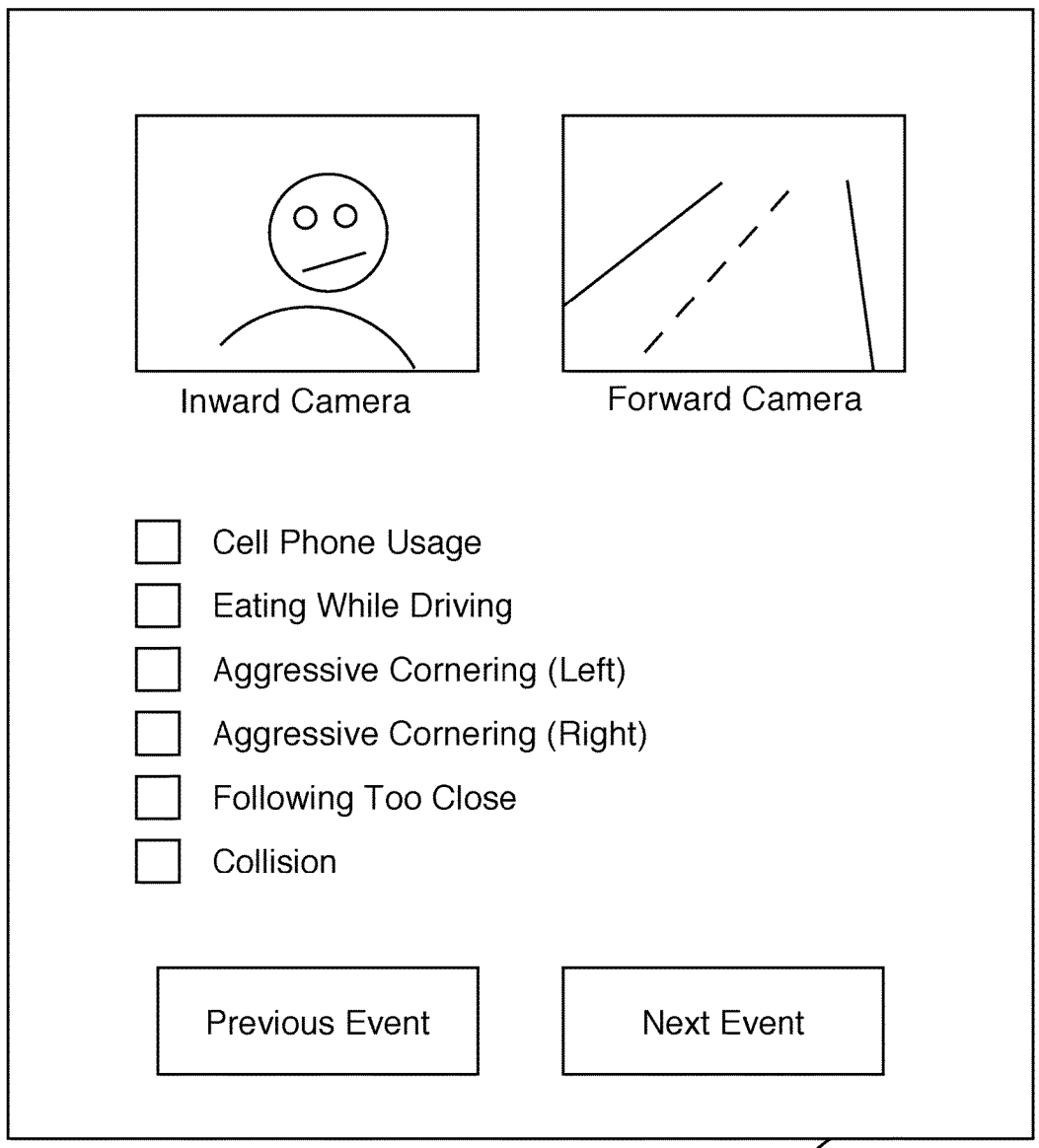
FIG. 5 is a diagram illustrating an embodiment of a user interface for a manual safety score determiner.

FIG. 5 is a diagram illustrating an embodiment of a user interface for a manual safety score determiner. In some embodiments, the manual safety score determiner comprises manual safety score determiner 402 of FIG. 4. In some embodiments, a maneuver reviewer (e.g., a human) uses the user interface for the manual safety score determiner to indicate a safety score. In the example shown, user interface 500 comprises an inward camera display and a forward camera display. The inward camera display displays video from an inward-facing camera (e.g., facing the driver) and the forward camera display displays video from a forward-facing camera (e.g., facing the road ahead). In some embodiments, one of the inward camera display and the forward camera display does not display video (e.g., video data from only one camera is present). User interface 500 comprises a set of hazardous behavior checkboxes. In the example shown, user interface 500 comprises checkboxes for cell phone usage, eating while driving, aggressive cornering (left), aggressive cornering (right), following too close, and collision. In various embodiments, user interface 500 comprises hazardous behavior checkboxes for Driving Fundamentals, Driver Distractions, Driver Awareness, Driver Condition, Road/Traffic Conditions, Weather Conditions, Seatbelt Usage, or any other appropriate hazardous behaviors. User interface 500 additionally comprises a previous event button to return to review of a previous event, and a next event button to begin review of a next event. In some embodiments, a safety score is determined for the event associated with the displayed video data based on the hazardous behavior checkboxes selected by the maneuver reviewer.

Figure 6:
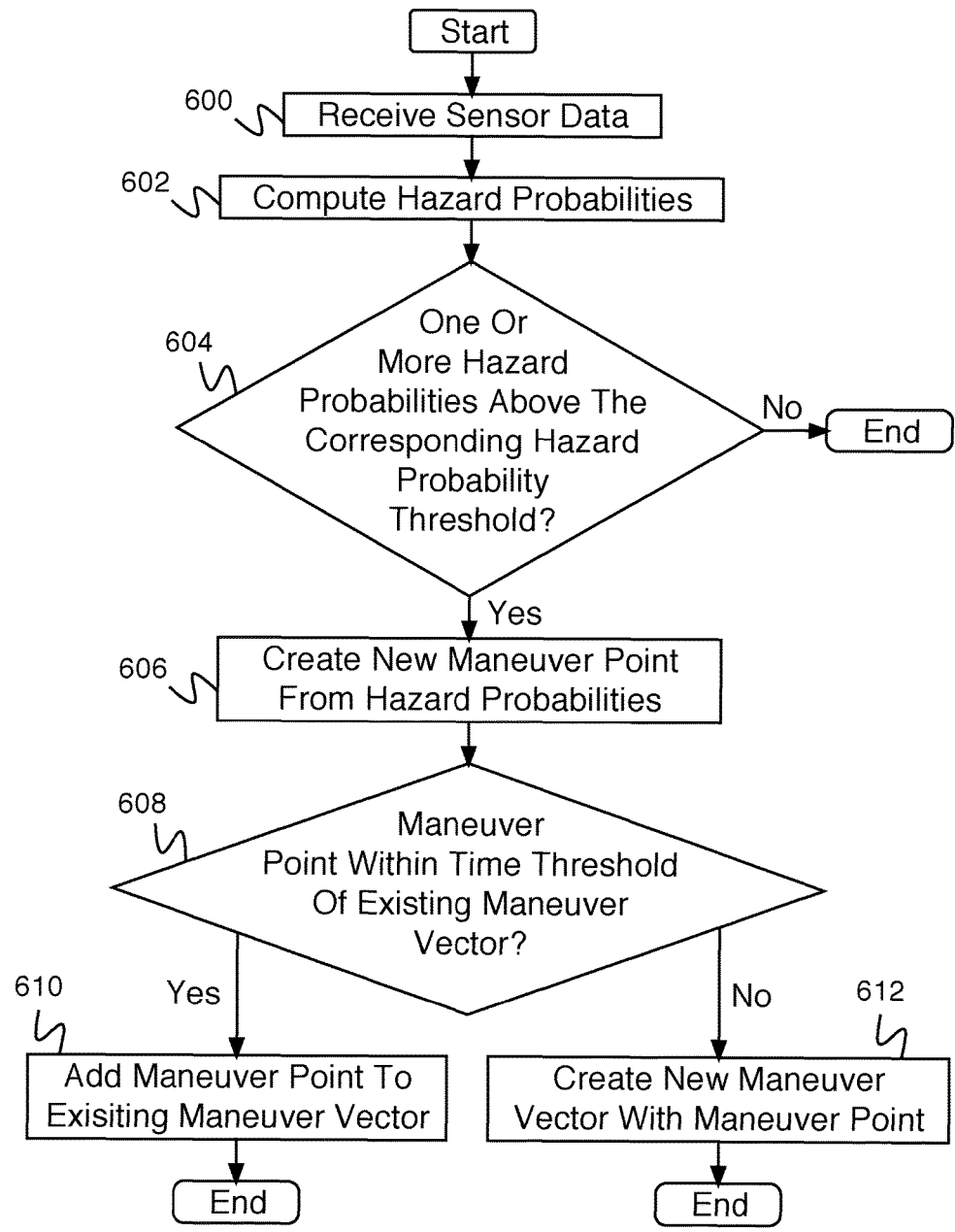
FIG. 6 is a flow diagram illustrating an embodiment of a process for building a maneuver vector.

FIG. 6 is a flow diagram illustrating an embodiment of a process for building a maneuver vector. In some embodiments, the process of FIG. 6 is executed by vehicle event recorder 300 of FIG. 3. In the example shown, in 600, sensor data is received. In various embodiments, sensor data comprises video camera data, microphone data, accelerometer data, gyroscope data, outdoor temperature sensor data, moisture sensor data, laser line tracker sensor data, vehicle state sensor data, or any other appropriate sensor data. In some embodiments, sensor data comprises calibrated accelerometer data from one or more accelerometers. In 602, hazard probabilities are computed. In some embodiments, hazard probabilities are computed by processing the sensor data received in 600. In various embodiments, hazard probabilities are computed by digital filtering, digital Fourier transform processing, a neural network, ensemble modeling, or any other appropriate technique. In various embodiments, hazard probabilities comprise a probability of hazardous acceleration, a probability of hazardous braking, a probability of a collision, a probability of hazardous left cornering, a probability of hazardous right cornering, a probability of a hazardous rough road, a probability of another hazardous condition, or any other appropriate hazard probability. In 604, it is determined whether one or more of the hazard probabilities is above the corresponding hazard probability threshold. If it is determined that one or more of the hazard probabilities is not above the corresponding hazard probability threshold, the process ends. If it is determined that one or more of the hazard probabilities is above the corresponding hazard probability threshold, control passes to 606. In 606, a new maneuver point is created from the hazard probabilities. In some embodiments, creating a new maneuver point from the hazard probabilities comprises storing the hazard probabilities as the maneuver point. In various embodiments, a maneuver point additionally comprises a date of creation, a time of creation, a driver identifier, a fleet identifier, a company identifier, a location, sensor data, a vehicle identifier, a maneuver point identifier, or any other appropriate maneuver point data. In 608 it is determined whether the maneuver point is within a time threshold of an existing maneuver vector. In some embodiments, a time threshold comprises a time threshold since the first maneuver point in the maneuver vector. In some embodiments, a time threshold since the most recent point in the maneuver vector. If it is determined that the maneuver point is within the time threshold of an existing maneuver vector, control passes to 610. In 610, the maneuver point is added to the existing maneuver vector, and the process ends. If it is determined in 608 that the maneuver point is not within the time threshold of an existing maneuver vector, control passes to 612. In 612, a new maneuver vector is created with the maneuver point. In some embodiments, creating a new maneuver vector with the maneuver point comprises storing the maneuver point as the maneuver vector. In various embodiments, a maneuver vector additionally comprises a driver identifier, a vehicle identifier, a fleet identifier, a company identifier, a number of maneuver points, a time of creation, a time of most recent maneuver point, a duration, a location, sensor data, processed sensor data, statistical information on sensor data, indication of whether the maneuver vector comprises associated video, a maneuver vector identifier, or any other appropriate maneuver vector data.

Figure 7:
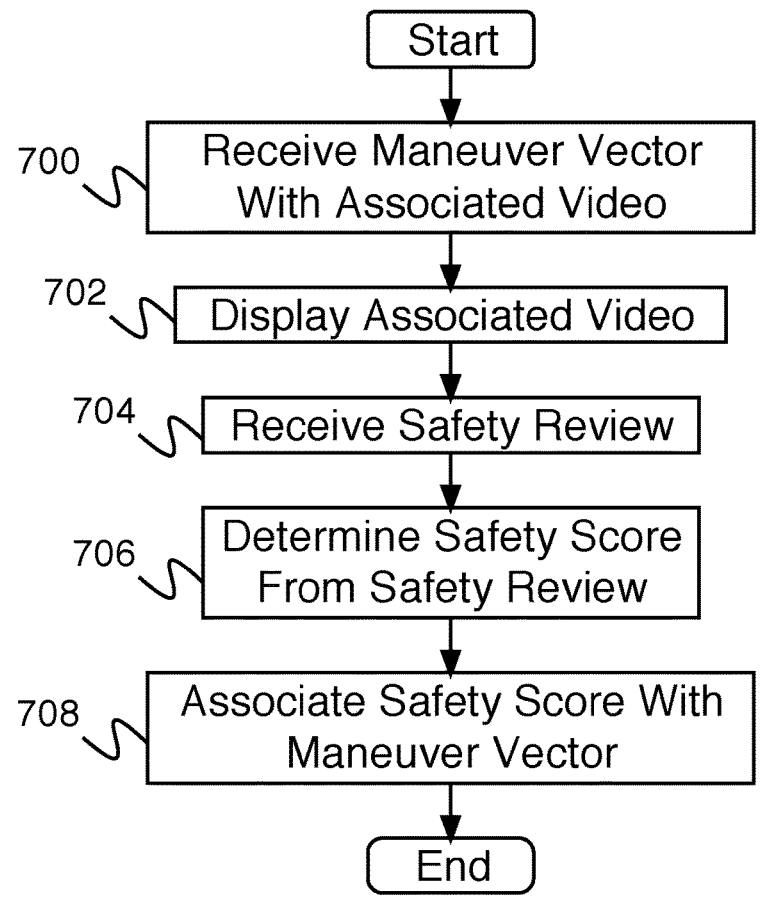
FIG. 7 is a flow diagram illustrating an embodiment of a process for manually determining a safety score.

FIG. 7 is a flow diagram illustrating an embodiment of a process for manually determining a safety score. In some embodiments, the process of FIG. 7 is executed by manual safety score determiner 402 of FIG. 4. In 700, a maneuver vector with associated video is received (e.g., from a vehicle event recorder). In 702, the associated video is displayed (e.g., to a human maneuver reviewer). In 704, a safety review is received. In some embodiments, a safety review comprises a set of associated hazardous behaviors. In 706, a safety score is determined from the safety review. In some embodiments, determining the safety score comprises summing a set of safety scores associated with each of the set of hazardous behaviors. In 708, the safety score is associated with the maneuver vector. In some embodiments, the maneuver vector and associated safety score are provided to an automatic safety score determiner and to a safety score database.

Figure 8:
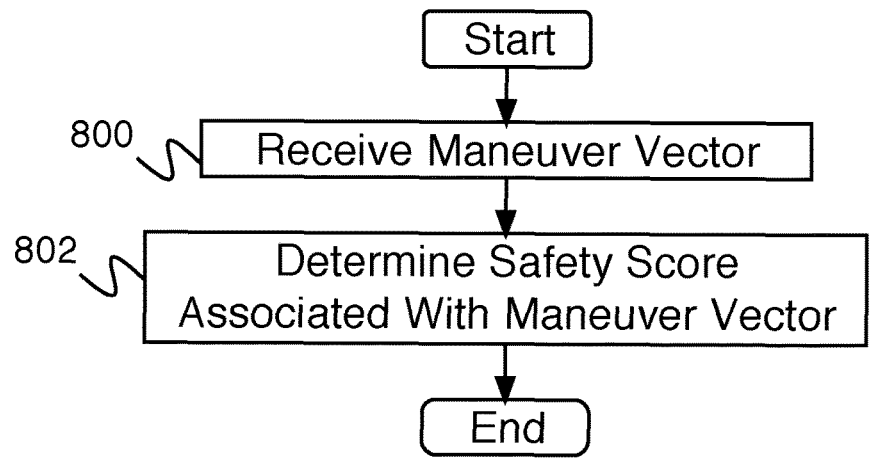
FIG. 8 is a flow diagram illustrating an embodiment of a process for automatically determining a safety score.

FIG. 8 is a flow diagram illustrating an embodiment of a process for automatically determining a safety score. In some embodiments, the process of FIG. 8 is executed by automatic safety score determiner 404 of FIG. 4. In 800, a maneuver vector is received. In some embodiments, the maneuver vector is associated with video data. In some embodiments, the maneuver vector is not associated with video data. In 802, a safety score associated with the maneuver vector is determined. In various embodiments, safety score is determined by using a table, by interpolating between values in a table, by using a neural network, by using machine learning techniques, by using a support vector machine, ensemble modeling or by using any other appropriate technique. In some embodiments, the safety score is provided to a safety score database.

Figure 9:
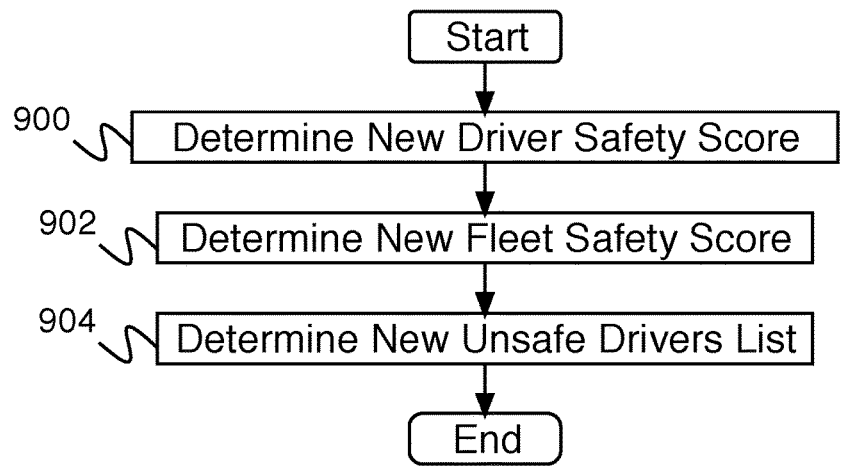
FIG. 9 is a flow diagram illustrating a process for determining overall safety scores.

FIG. 9 is a flow diagram illustrating a process for determining overall safety scores. In some embodiments, the process of FIG. 9 is executed by safety score database 406 of FIG. 4. In various embodiments, the process of FIG. 9 is executed at predetermined intervals (e.g., every day, every week, etc.), upon a command (e.g., the command of the fleet supervisor, etc.), each time a safety score is received by the safety score database, or any other appropriate time. In the example shown, in 900, a new driver safety score is determined. In some embodiments, determining a new driver safety score comprises summing a set of safety scores associated with the driver. In some embodiments, the set of safety scores comprises the set of safety scores received over a current period of time (e.g., the most recent day, the most recent month, the most recent 180 days, the most recent year, etc.). In some embodiments, the safety scores are weighted such that more recent safety scores affect the driver safety score more than older safety scores. In 902, a new fleet safety score is determined. In some embodiments, determining a new fleet safety score comprises averaging the driver safety score for each driver in the fleet. In 904 a new unsafe drivers list is determined. In some embodiments, a new unsafe drivers list comprises a list of drivers with driver safety score worse than a threshold, a list of the top 10% most unsafe drivers, a list of the top 25 most unsafe drivers (e.g., worst safety score drivers), a ranked list, or a list of any other appropriate unsafe drivers. In some embodiments, a new unsafe drivers list comprises a list of drivers that require coaching.

Figure 10:
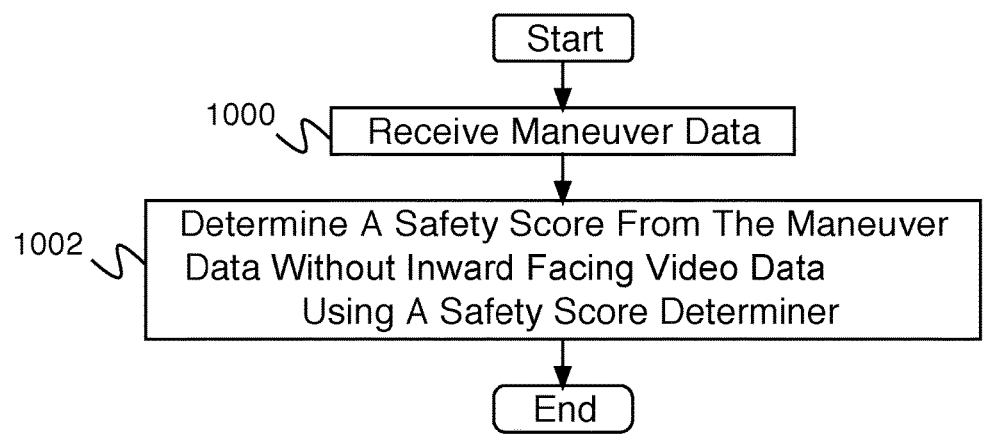
FIG. 10 is a flow diagram illustrating a process for determining a safety score.

FIG. 10 is a flow diagram illustrating a process for determining a safety score. In the example shown, in 1000 maneuver data is received. In 1002, a safety score is determined from the maneuver data without inward facing video using a safety score determiner. Maneuver data received is matched to a library of previously captured maneuvered data. Each maneuver data stored in the library of previously captured maneuver data is stored with an associated safety score. The associated safety score was assigned either automatically or manually and stored in the library associated with the maneuver data. The maneuver data in the library is either with or without inward facing video data and is either directly associated with the driver associated with the received maneuver data or not at all associated with the driver associated with the received maneuver data. The safety score is provided for the driver.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for determining a safety score, comprising:
   receiving maneuver data;
   rendering, by a processor, video associated with the maneuver data and at least one corresponding hazard option on a user interface;
   receiving at least one selection of the at least one hazard option;
   determining, by the processor, a first safety score based on the received at least one selection;
   associating, by the processor, the determined first safety score with the maneuver data; and
   outputting, by the processor, the association of the determined first safety score with the maneuver data.

2. The method of claim 1, wherein the received maneuver data includes a maneuver vector.

3. The method of claim 1, wherein the received maneuver data includes a maneuver vector and associated video.

4. The method of claim 1, wherein the determination of the first safety score includes summing a set of safety scores associated with each of the at least one hazard option.

5. The method of claim 1, wherein the association of the determined first safety score with the maneuver data is output to an automatic safety score determiner.

6. The method of claim 1, wherein the association of the determined first safety score with the maneuver data is output to an automatic safety score database.

7. The method of claim 1, wherein the rendering of video associated with the maneuver data and at least one corresponding hazard option on a user interface includes video captured by an inward camera.

8. The method of claim 1, wherein the rendering of video associated with the maneuver data and at least one corresponding hazard option on a user interface includes video captured by a forward camera.

9. The method of claim 1, wherein the rendering of video associated with the maneuver data and at least one corresponding hazard option on a user interface includes displaying video captured by an inward camera and video captured by a forward camera side by side.

10. The method of claim 1, wherein the rendered at least one corresponding hazard option includes cell phone usage.

11. The method of claim 1, wherein the rendered at least one corresponding hazard option includes eating while driving.

12. The method of claim 1, wherein the rendered at least one corresponding hazard option includes cornering.

13. The method of claim 1, wherein the rendered at least one corresponding hazard option includes cornering and an associated direction.

14. The method of claim 1, wherein the rendered at least one corresponding hazard option includes following within a threshold distance of a preceding vehicle.

15. The method of claim 1, wherein the rendered at least one corresponding hazard option includes a collision.

16. The method of claim 1, the rendering of video associated with the maneuver data and at least one corresponding hazard option on a user interface includes rendering an option to advance to a next event.

17. The method of claim 1, the rendering of video associated with the maneuver data and at least one corresponding hazard option on a user interface includes rendering an option to advance to a previous event.

18. The method of claim 1, wherein the receiving at least one selection of the at least one hazard option includes a safety review.

19. A system for determining a safety score, comprising:
   a communications interface configured to receive maneuver data; and
   a processor configured to:
      render video associated with the maneuver data and at least one corresponding hazard option on a user interface;
      receive, via the communications interface, at least one selection of the at least one hazard option;
      determine a first safety score based on the received at least one selection;
      associate the determined first safety score with the maneuver data; and output the association of the determined first safety score with the maneuver data.

20. A computer program product for determining a safety score, the computer program product being embodied in a non-transitory computer readable storage medium and comprising computer instructions for:
   receiving maneuver data;
   rendering, by a processor, video associated with the maneuver data and at least one corresponding hazard option on a user interface;
   receiving at least one selection of the at least one hazard option;
   determining, by the processor, a first safety score based on the received at least one selection;
   associating, by the processor, the determined first safety score with the maneuver data; and
   outputting, by the processor, the association of the determined first safety score with the maneuver data.

* * * * *